US010769980B2

(12) United States Patent
Kim et al.

(10) Patent No.: US 10,769,980 B2
(45) Date of Patent: Sep. 8, 2020

(54) TILED DISPLAY AND OPTICAL COMPENSATION METHOD THEREOF

(71) Applicant: LG Display Co., Ltd., Seoul (KR)

(72) Inventors: Daehyun Kim, Paju-si (KR); Junyoung Huh, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 12 days.

(21) Appl. No.: 16/186,950

(22) Filed: Nov. 12, 2018

(65) Prior Publication Data

US 2019/0206299 A1 Jul. 4, 2019

(30) Foreign Application Priority Data

Dec. 28, 2017 (KR) ........................ 10-2017-0182086

(51) Int. Cl.

| | |
|---|---|
| ***G09G 3/20*** | (2006.01) |
| ***G09G 3/32*** | (2016.01) |
| ***G06F 3/14*** | (2006.01) |
| ***H04N 1/60*** | (2006.01) |
| ***H04N 5/57*** | (2006.01) |
| ***H04N 9/64*** | (2006.01) |
| ***H04N 9/77*** | (2006.01) |
| ***G09G 3/3225*** | (2016.01) |
| *G09G 3/3275* | (2016.01) |
| *G09G 3/3266* | (2016.01) |

(52) U.S. Cl.

CPC ............ *G09G 3/2003* (2013.01); *G09G 3/20* (2013.01); *G09G 3/3225* (2013.01); *G09G 3/3266* (2013.01); *G09G 3/3275* (2013.01); *G09G 2300/026* (2013.01); *G09G 2310/027* (2013.01); *G09G 2310/08* (2013.01); *G09G 2320/0242* (2013.01); *G09G 2320/0276* (2013.01)

(58) Field of Classification Search

CPC combination set(s) only.
See application file for complete search history.

(56) References Cited

U.S. PATENT DOCUMENTS

2011/0109658 A1* 5/2011 Park ..................... G09G 3/3406 345/690
2011/0285738 A1* 11/2011 Hsieh ..................... G09G 5/02 345/589
2015/0054864 A1* 2/2015 Choi ..................... G09G 3/2003 345/694
2016/0358582 A1* 12/2016 Lee ..................... G09G 5/10

FOREIGN PATENT DOCUMENTS

KR 10-2007-0116618 A 12/2007
KR 10-2015-0022235 A 3/2015

* cited by examiner

*Primary Examiner* — Wesner Sajous
(74) *Attorney, Agent, or Firm* — Seed Intellectual Property Law Group LLP

(57) ABSTRACT

Disclosed are a tiled display and an optical compensation method thereof. The tiled display includes a color coordinate compensation circuit configured to convert color coordinates of pure color data to be displayed in display panels into target color coordinates having a color gamut smaller than a color gamut defined in color coordinates of each of display panels, and convert the pure color data into a data combination of two or more different colors.

8 Claims, 12 Drawing Sheets

TILED DISPLAY AND OPTICAL COMPENSATION METHOD THEREOF

CROSS-REFERENCE TO RELATED APPLICATION(S)

This application claims the benefit of Korean Patent Application No. 10-2017-0182086, filed on Dec. 28, 2017, which is incorporated herein by reference for all purposes as if fully set forth herein.

BACKGROUND

Technical Field

The present disclosure relates to a tiled display realizing a large screen using a plurality of display panels and an optical compensation method thereof.

Description of the Related Art

Digital signage reproduces visual information in a large screen in a commercial space. Digital signage is a large-screen display known as multi-vision or a video wall using a tiled display.

A tiled display includes a plurality of display panels bonded to a large screen. In order to improve image quality of a digital signage, a bezel of display panels must be minimized so that the boundary between the display panels is minimized and there should be no difference in image quality between the display panels. Since a digital signage may be installed in an outdoor area, it is required to have high luminance (or brightness) to ensure reliability of a display panel suitable for harsh outside environment and to provide a clear image even in the sunlight.

BRIEF SUMMARY

Display panels constituting a tiled display may have a difference in color coordinates therebetween due to variations in manufacturing process. An optical compensation method capable of reducing a difference in color coordinates between display panels is required.

Accordingly, the present disclosure provides a tiled display capable of minimizing the difference in color representation between display panels of the tiled display and an optical compensation method thereof.

A tiled display of the present disclosure includes two or more display panels, and a color coordinate compensation circuit configured to convert color coordinates of pure color data to be displayed in the display panels into target color coordinates having a color gamut smaller than a color gamut defined in color coordinates of each of the display panels, and convert the pure color data into a data combination of two or more different colors.

An optical compensation method of the tiled display includes: converting color coordinates of pure color data to be displayed in display panels into target color coordinates having a color gamut smaller than a color gamut defined in color coordinates of each of the display panels; and converting the pure color data into a combination of two or more different color data.

BRIEF DESCRIPTION OF THE SEVERAL VIEWS OF THE DRAWINGS

The above and other aspects, features, and advantages of the present disclosure will be more clearly understood from the following detailed description taken in conjunction with the accompanying drawings, in which.

DETAILED DESCRIPTION

Figure 1:
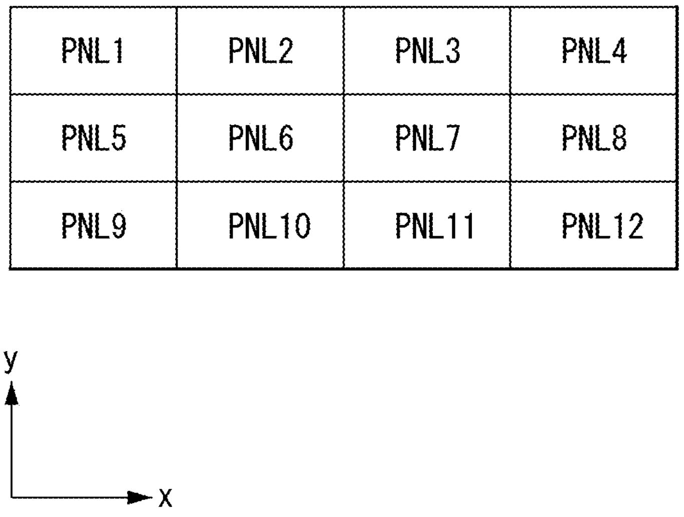
FIG. 1 is a view schematically illustrating a tiled display screen according to an embodiment of the present disclosure.

Advantages and features of the present disclosure, and implementation methods thereof will be clarified through following embodiments described with reference to the accompanying drawings. The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art. Further, the present disclosure is only defined by scopes of claims.

A shape, a size, a ratio, an angle, and a number disclosed in the drawings for describing embodiments of the present disclosure are merely an example, and thus, the present disclosure is not limited to the illustrated details. Like reference numerals refer to like elements throughout. In the following description, when the detailed description of the relevant known function or configuration is determined to unnecessarily obscure the important point of the present disclosure, the detailed description will be omitted.

In a case where 'comprise', 'have', and 'include' described in the present specification are used, another part may be added unless 'only~' is used. The terms of a singular form may include plural forms unless referred to the contrary.

In construing an element, the element is construed as including an error range although there is no explicit description.

In describing a position relationship, for example, when two portions are described as "~on", "~above", "~below", or "~on the side", one or more other components may be positioned between the two components unless "immediately" or "directly" is used.

It will be understood that, although the terms "first", "second", etc., may be used herein to differentiate components, these components should not be limited by these terms.

Features of various embodiments of the present disclosure may be partially or overall coupled to or combined with each other and may be variously inter-operated with each other and driven technically as those skilled in the art can sufficiently understand. The embodiments of the present disclosure may be carried out independently from each other or may be carried out together in co-dependent relationship.

A tiled display of the present disclosure may be realized by a flat panel display device such as an organic light emitting display (OLED) display, a liquid crystal display (LCD), and the like. In the following embodiments, an organic light emitting display device will be described as an example of a flat panel display device, but the present disclosure is not limited thereto.

The pixels of the organic light emitting display device include an OLED and a driving element for driving the OLED by supplying a current to the OLED according to a gate-source voltage. The driving device may be realized as a TFT having a metal oxide semiconductor field effect transistor (MOSFET) structure. The OLED and the driving element may not be uniform between the pixels and between the sub-pixels. Electrical characteristics of the OLED and driving element must be uniform throughout a screen but the electrical characteristics may be different between pixels due to process variations and device characteristics variations and may change with the passage of display driving time.

In order to compensate for the electrical characteristics variations of the OLED and the driving element, an internal compensation method and an external compensation method may be applied to the organic light emitting display device. In the internal compensation method, a gate-source voltage Vgs of the driving element, which varies according to electrical characteristics of the driving element, is sampled and a data voltage is compensated by the gate-source voltage. In the external compensation method, electrical characteristics of a pixel, which varies according to electrical characteristics of the OLED and the driving element, are sensed and pixel data of an input image is modulated with a compensation value determined according to a sensing result, whereby a degradation due to electrical characteristics variations between pixels and aging of the pixels may be compensated. In the following embodiment, an example in which an external compensation circuit is applied to each of the display panels in the tiled display of the present disclosure will be described, but the present disclosure is not limited thereto.

According to optical compensation of the present disclosure, color coordinates of pure color data are converted into color coordinates of a common color gamut of all display panels capable of covering all the color coordinates of each of the display panels. In addition, in the optical compensation method of the present disclosure, pure color data is represented by a combination of two or more types of pure color data or a combination of one or more types of pure data and white data in the tiled display. A pure color refers to a color with highest chroma and includes red (R), green (G), and blue (B) in an embodiment.

Hereinafter, various embodiments of the present disclosure will be described in detail with reference to the accompanying drawings. In the following embodiments, an organic light emitting display device employing an external compensation circuit will be described as an example.

Figure 2:
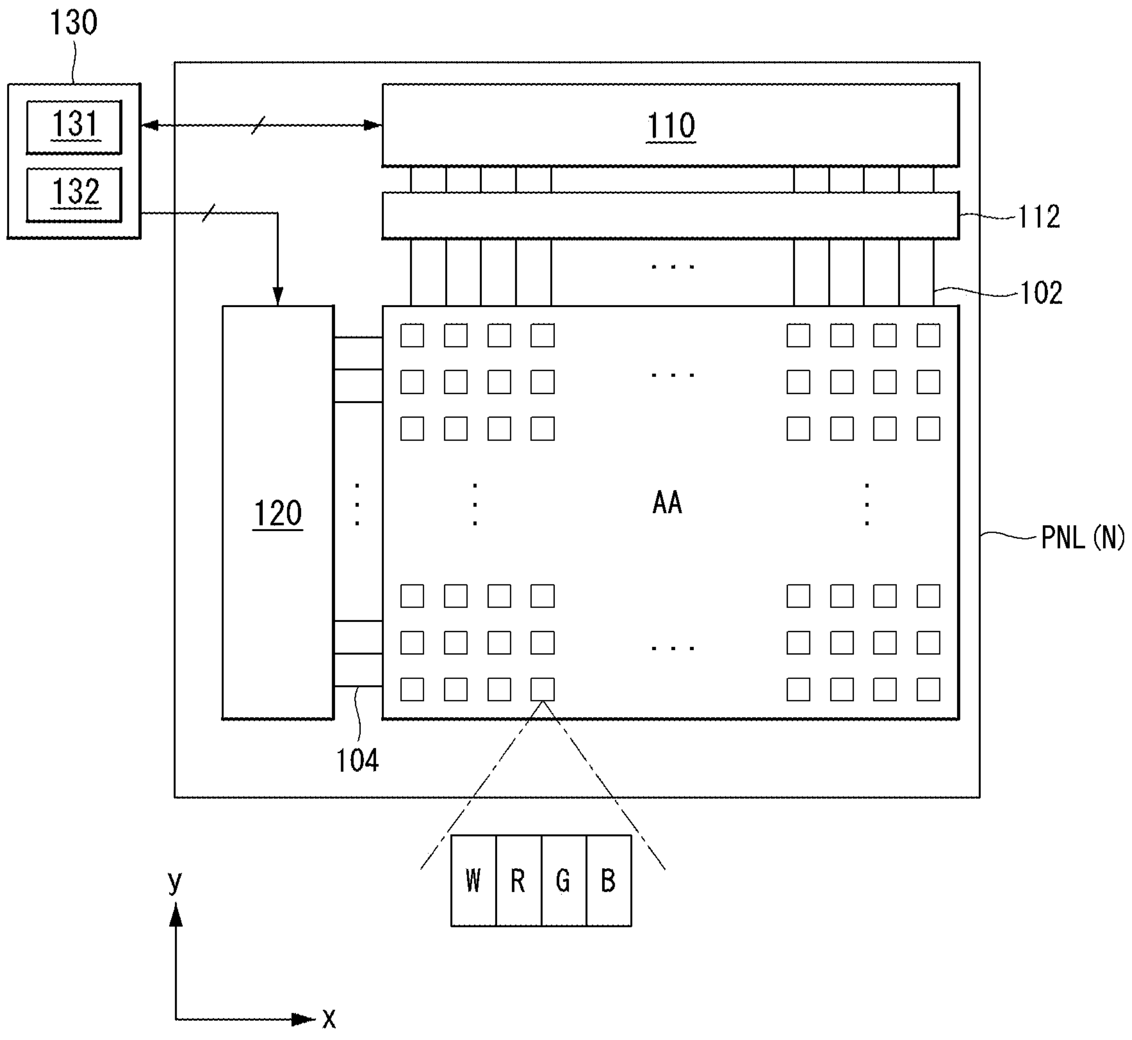
FIG. 2 is a block diagram illustrating a display panel illustrated in FIG. 1 and a display panel driver.
Figure 3:
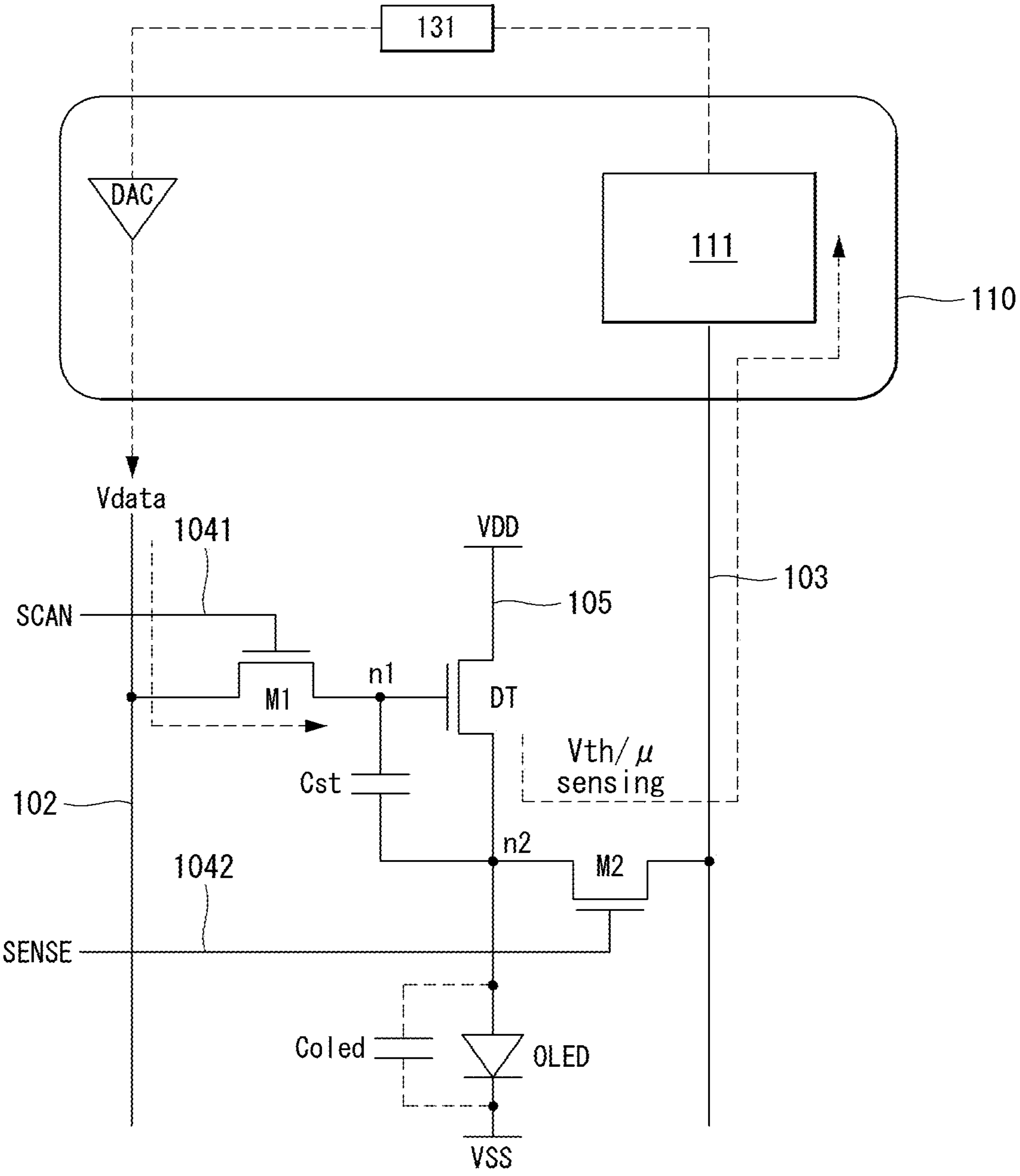
FIG. 3 is a circuit diagram illustrating an external compensation circuit connected to a pixel circuit.

Referring to FIGS. 1 to 3, a tiled display according to an embodiment of the present disclosure includes a plurality of display panels PNL1 to PNL12 and a plurality of display panel drivers.

A screen of the Nth (N is a natural number) display panel PNL(N) includes an active area AA displaying an input image. A pixel array is arranged in the active area AA. The pixel array includes a plurality of data lines 102, a plurality of gate lines 104 intersecting with the data lines 102, and pixels arranged in a matrix form. Each of the pixels may be divided into a red subpixel, a green subpixel, and a blue subpixel for color realization. Each of the pixels may further include a white subpixel as in the example of FIG. 2. In the example of FIG. 2, "W" represents a white subpixel, "R" represents a red subpixel, "G" represents a green subpixel, and "B" represents a blue subpixel. Each of the subpixels includes a pixel circuit illustrated in FIG. 3.

Each of the display panels PNL1 to PNL12 may be implemented as a display panel of an organic light emitting display device. The display panels PNL1 to PNL12 are driven by the display panel driver to display pixel data of an input image. The display panel driver may include an external compensation circuit. An operating mode of the display panel driver may be divided into a normal driving mode for displaying an input image on the screen, and a sensing mode for sensing electrical characteristics of pixels using the external compensation circuit. In the normal driving mode, the display panel driver writes pixel data of the input image to the pixels under the control of a timing controller (TCON) 130. In the sensing mode, the Nth display panel driver senses electrical characteristics of the driving element for each subpixel under the control of the timing controller 130, selects a compensation value according to a sensing result, and compensates for a change in the electrical characteristics of the driving element DT.

The display panel drivers 110, 112 and 120 may be connected to the display panels, respectively, to drive one display panel. The Nth display panel driver 110, 112 and 120 may be connected to the Nth display panel PNL(N) to drive the pixels of the Nth display panel PNL(N) and sense electrical characteristics of the pixels. The Nth display panel driver 110, 112 and 120 compensates for a difference in electrical characteristics and a degradation of the pixels on the basis of a sensing result. The Nth display panel drivers 110, 112 and 120 include a data driver 110 and a gate driver 120. A demultiplexer 112 may be disposed between the data driver 110 and data lines 102. The demultiplexer 112 may be omitted.

The Nth display panel driver writes pixel data of an input image to the pixels of the Nth display panel 100 under the control of the timing controller 130 in the normal driving mode to display the input image on the screen.

The Nth display panel driver further includes a display module power circuit (or unit). The display module power unit receives main power and generates driving power of the Nth display panel driver and analog power of the Nth display panel PNL(N). For example, the display module power unit outputs power such as a gamma reference voltage, a reference voltage Vref, a gate high voltage VGH, a gate low voltage VGL, and the like. The gamma reference voltage is divided by a voltage dividing circuit and converted into a gamma compensation voltage corresponding to a gray voltage of pixel data and supplied to the data driver 110. The power unit includes a charge pump, a regulator, a buck converter, a boost converter, and the like.

As illustrated in FIG. 3, the data driver 110 converts pixel data (digital data) of an input image received from the timing controller 130 at every frame period into a gamma compensation voltage using a digital-to-analog converter (DAC) to output a data voltage Vdata. The data voltage Vdata is applied to the pixels through the demultiplexer 112 and the data line 102. The demultiplexer 112 is disposed between the data driver 110 and the data lines 102 and distributes the data voltage Vdata output from the data driver 110 to the data lines 102 using a plurality of switching elements. Since one channel of the data driver 110 is connected to the plurality of data lines in a time-division manner by the demultiplexer 112, the number of data lines 102 may be reduced.

The gate driver 120 may be realized as a gate-in-panel (GIP) circuit formed directly in a bezel region on the display panel 100 together with a TFT array of the active area AA. The gate driver 120 outputs a gate signal (or a scan signal) to the gate lines 104 under the control of the timing controller 130. The gate driver 120 may shift the gate signals using a shift register to sequentially supply the gate signals to the gate lines 104. The gate signal may include, but is not limited to, a scan signal SCAN and a sensing signal SENSE. The scan signal SCAN and the sensing signal SENS may be synchronized with the data voltage Vdata of the input image or sensing data voltage Vdata. The data voltage Vdata of the input image is a gray voltage of pixel data input in the normal driving mode. The sensing data voltage Vdata is a predetermined voltage set irrespective of the input image data and appropriately charges a gate voltage of the driving element DT to sense a threshold voltage Vth of the driving element DT.

The gate signals SCAN and SENSE may be generated as pulses swinging between the gate high voltage VGH and the gate low voltage VGL. The switching elements M1 and M2 of the pixel circuit are turned on in response to the gate-on-voltage VGH of the gate signals SCAN and SENSE.

The timing controller 130 controls operation timing of the display panel drivers 110, 112, and 120 in the normal driving mode and the sensing mode. The timing controller 130 receives pixel data of an input image and a timing signal synchronized with the pixel data from a host system (not shown). The timing controller 130 transmits the pixel data of the input image received from the host system to the data driver 110. The timing signal received by the timing controller 130 may include a vertical synchronization signal Vsync, a horizontal synchronization signal Hsync, a clock signal DCLK, a data enable signal DE, and the like.

The host system distributes the pixel data of the input image to each display panel and synchronizes the timing controllers 130 of the display panels.

The timing controller 130 generates timing control signals for controlling operation timing of the display panel driver on the basis of the timing signals (Vsync, Hsync, DE) received from the host system to control operation timing of the display panel driver. A voltage level of the gate timing control signal output from the timing controller 130 may be converted into a gate-on voltage and a gate-off voltage through a level shifter (not shown) and supplied to the gate driver 120. The level shifter converts a low-level voltage of the gate timing control signal into a gate low voltage VGL and converts a high-level voltage of the gate timing control signal into a gate high voltage VGH.

The timing controller 130 may adjust a frame rate to a frequency equal to or higher than an input frame frequency. For example, the timing controller 130 may multiply the input frame frequency by i times and control operation timing of the display panel driver at a frame frequency×i (i is a positive integer greater than 0) Hz. The frame frequency is 60 Hz in a national television standards committee (NTSC) system and 50 Hz in a phase-alternating line (PAL) system.

The timing controller 130 may include first and second compensation circuits (or units) 131 and 132. The first compensation unit 131 compensates for pixel deviations and degradation through an external compensation method. The pixel data of the input image is compensated with a compensation value selected on the basis of a sensing result of a pixel circuit for each subpixel. In order to optically compensate for pure color variations between the display panels PNL1 to PNL12, the second compensation unit 132 (which may be referred to herein as the color coordinate compensation unit 132) converts maximum color coordinates of pure color data to be written into the pixels of the display panel PNL(N) and converts the pure color data into data combinations of two or more different colors. The color coordinate compensation unit 132 may be connected to each of the display panel drivers. In some embodiments, a respective color coordination compensation unit 132 is connected to each of the display panel drivers, e.g., to the panel display driver of each respective display panel. In addition, in some embodiments, one color coordinate compensation unit 132 may be commonly connected to the plurality of display panel drivers (e.g., commonly connected to the display panel driver of all of the display panels). Details of the optical compensation algorithm will be described later.

The method of the target color coordinate conversion and converting the pure color data into data of two or more different colors in the second compensation unit 132 may be realized with compensation values stored in a memory (ROM) connected to the timing controller 130. These compensation values may be set as look-up table data reflecting the target color coordinate conversion and pure color data conversion value. Individual display panels constituting the tiled display have different maximum color coordinate levels. For this reason, maximum color coordinates of each of the display panels are measured at the optical compensating stage, a compensation value optimized for a corresponding display panels is calculated and stored in the memory (ROM) connected to the timing controller 130 in each display panel. When the panel is driven, the compensation value is read from the memory to modulate pixel data between the display panels.

In the tiled display of the present disclosure, the first compensation unit 131 first performs external compensation to compensate for the threshold voltage Vth of the driving element DT and the OLED and mobility μ of the driving element DT by subpixels, and optical compensation may be performed to compensate for luminance and color coordinate variations between the display panels PNL1 to PNL12 using the second compensation unit 132.

A compensation value of each panel is calculated on the basis of the threshold voltage Vth and mobility measured by subpixels in the corresponding panel and luminance and color coordinate values of the corresponding panel and stored in the memory before the product is released.

As illustrated in FIG. 3, the external compensation circuit includes a sensing line 103 connected to the pixel circuit, a sensing circuit (or unit) 111, and a first compensation unit 131 receiving sensing data (digital data) from the sensing unit 111. The DAC and the sensing unit 111 may be integrated in an integrated circuit (IC) of the data driver 110. The first compensation unit 131 may be installed in the timing controller 130.

The external compensation circuit may initialize a source voltage Vs of the sensing line 103 and the driving element DT, that is, a voltage of the second node n2, with a predetermined reference voltage Vref and subsequently sense a source voltage of the driving element DT to sense electrical characteristics (Vth, μ) of the driving element DT. The sensing unit 111 samples the voltage on the sensing line 103 in the sensing mode, converts the voltage into digital data through the ADC, and outputs sensing data.

The threshold value Vth of the OLED and the driving element DT and the initial value of mobility μ of the driving element DT for each subpixel are stored in a look-up table of the first compensation unit 131. The first compensation unit 131 compares the sensing data received through the ADC with the initial value stored in the lookup table to determine a compensation value for compensating for a change in driving characteristics of the subpixels and modulates the pixel data of the input image with the compensation value to thus compensate for the change in the electrical characteristics of the subpixels. The pixel data modulated by the first compensation unit 131 is transferred to the data driver 110, converted into a data voltage Vdata by the DAC of the data driver 110, and supplied to the data line 102.

As in the example of FIG. 3, the pixel circuit includes an OLED, a driving element DT connected to the OLED, a plurality of switching TFTs M1 and M2, and a capacitor Cst. The driving element DT and the switching TFTs M1 and M2 may be realized as n-channel transistors (NMOS) but are not limited thereto.

The OLED emits light with a current generated according to the gate-source voltage Vgs of the driving element DT which varies according to the data voltage Vdata. The OLED includes an organic compound layer formed between an anode and a cathode. The organic compound layer includes a hole injection layer (HIL), a hole transport layer (HTL), an emission layer (EML), an electron transport layer (ETL), an electron injection layer (EIL) but is not limited thereto. The anode of the OLED is connected to the driving element DT through the second node n2 and the cathode of the OLED is connected to an electrode VSS to which the low potential source supply voltage VSS is applied. In FIG. 3, "Coled" is the capacitance of the OLED.

The first switching TFT M1 is turned on according to the scan signal SCAN to connect the data line 102 to the first node n1 and supply the data voltage Vdata to a gate of the driving element DT connected to the first node n1. The first switching TFT M1 includes a gate connected to a first gate line 1041 to which the first scan signal SCAN is applied, a first electrode connected to the data line 102, and a second electrode connected to the first node n1.

The second switching TFT M2 is turned on according to the sensing signal SENSE to supply the reference voltage Vref to the second node n2. The second switching TFT M2 includes a gate connected to a second gate line 1042 to which the sensing signal SENSE is applied, a first electrode connected to the sensing line 103 to which the reference voltage Vref is applied, and a second electrode connected to the second node n2.

The driving element DT supplies current to the OLED according to the gate-source voltage Vgs thereof. The driving element DT includes a gate connected to the first node n1, a first electrode (or drain) connected to a VDD line 105 to which a pixel driving voltage VDD is supplied, and a second electrode (or source) connected to the anode of the OLED through the second node n2.

The capacitor Cst is connected between the first node n1 and the second node n2. The capacitor Cst charges the gate-source voltage Vgs of the driving element DT.

Figure 4:
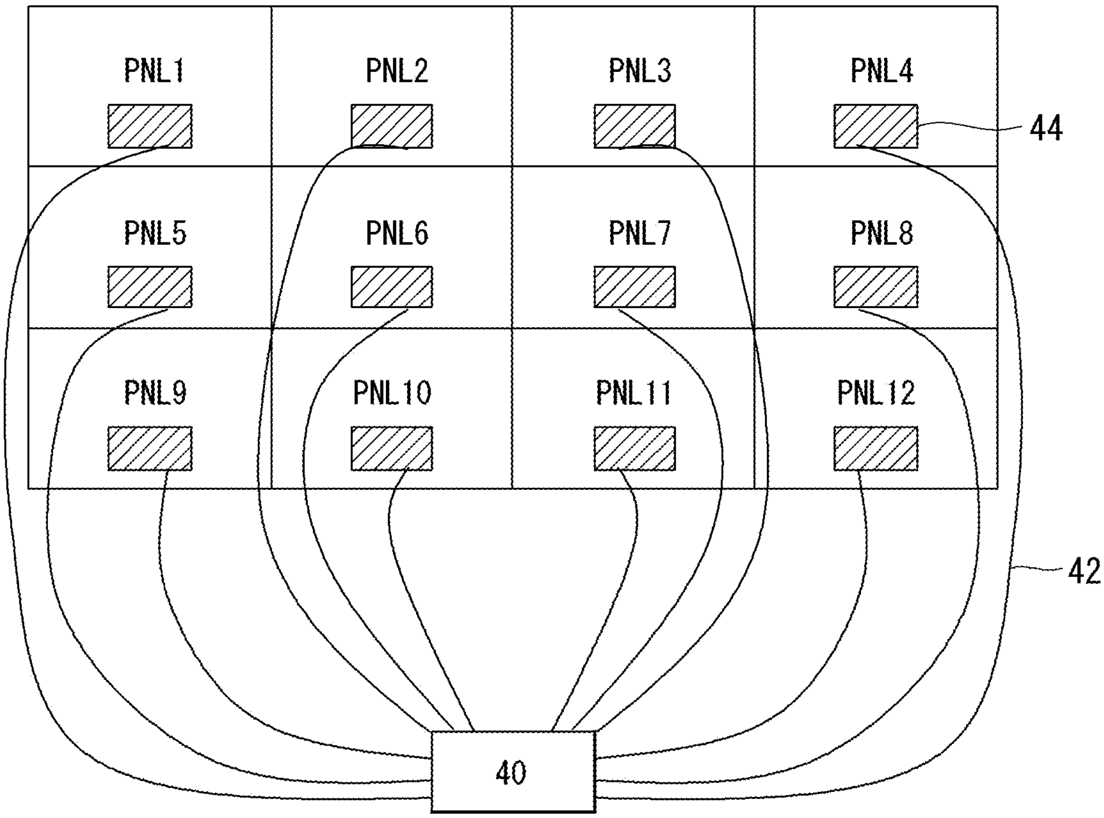
FIGS. 4 and 5 are views illustrating a rear side of a tiled display.
Figure 5:
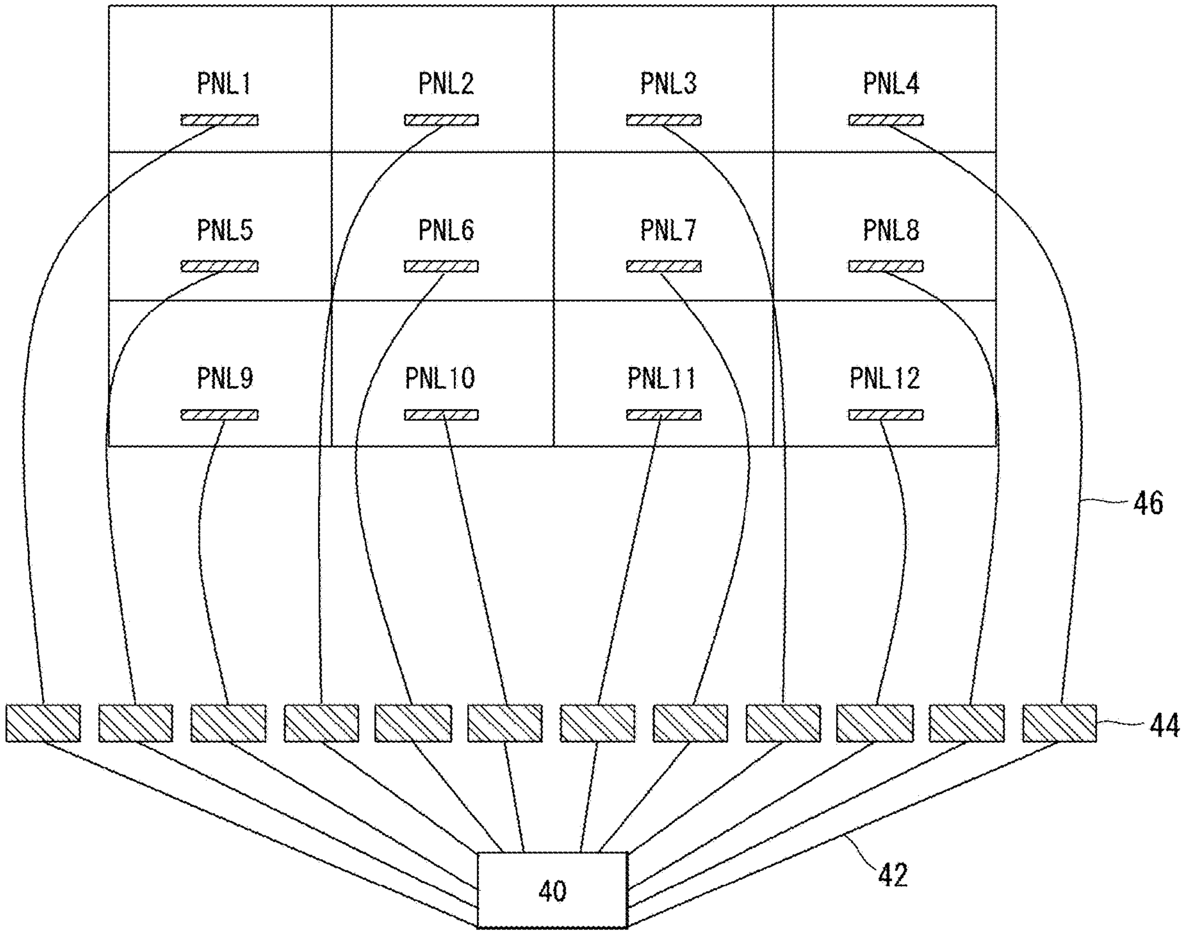

FIGS. 4 and 5 are views illustrating a rear surface of a tiled display.

Referring to FIGS. 4 and 5, the tiled display includes an integrated control box 40 and a plurality of control boards 44.

The integrated control box 40 includes a host system, an interface connecting an external peripheral device to the host system, and a main power source. The integrated control box 40 converts resolution of the input image to fit to resolution of each of the display panels PNL1 to PNL12 and distributes the converted resolution to the display panels PNL1 to PNL12 via a cable 42. Also, the control box 40 supplies main power generated by the main power source to the control boards 44 via the cable 42.

The control board 44 is connected to the display panel drivers 110, 112, and 120 for driving the display panels PNL1 to PNL12. Each of the control boards 44 includes the timing controller 130 and a display module power unit. The control boards 44 may be disposed on the rear side of the display panels PNL1 to PNL12 as illustrated in FIG. 4.

For ease of installation of the tiled display, as illustrated in FIG. 5, the control boards 44 may be separated from the display panels PNL1 to PNL12 and disposed at separate positions. In this case, a small interface board 48 may be disposed on the rear surface of the display panels PNL1 to PNL12. The interface board 48 is connected to the control boards 44 via the cable 46 and is connected to the display panel drivers 110, 112 and 120. The interface board 48 supplies signals and power from the control boards 44 to the display panel drivers 110, 112, and 120.

Figure 6:
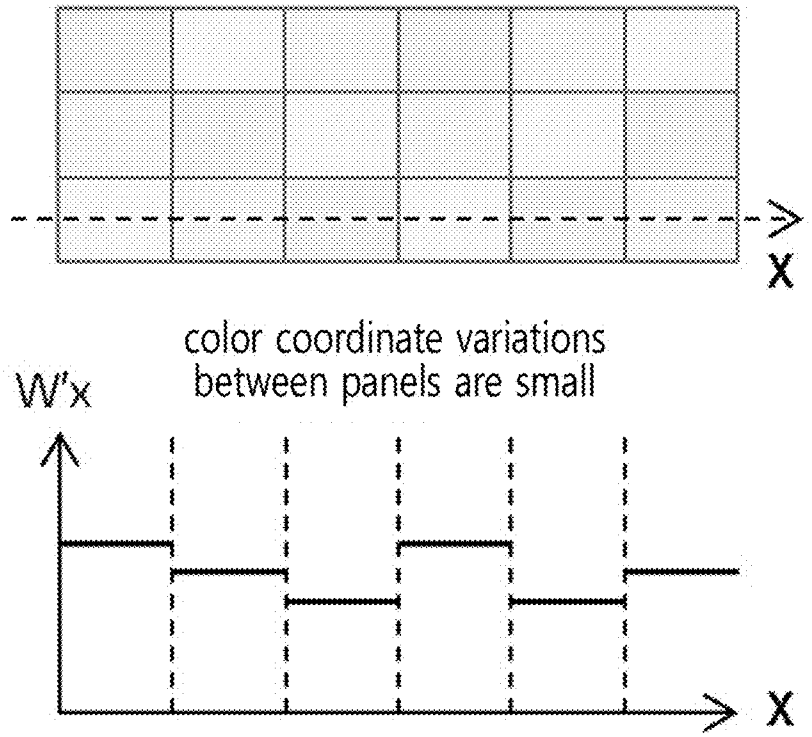
FIG. 6 is a view illustrating white color variations of a tiled display.
Figure 7:
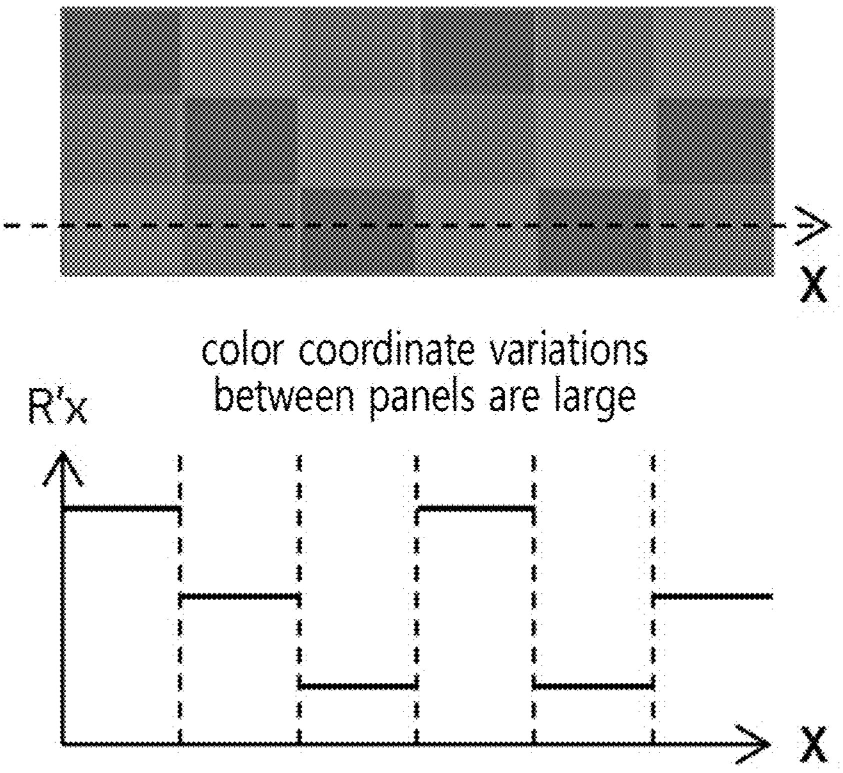
FIG. 7 is a view illustrating red color coordinate variations among display panels when a red image is displayed on a screen of a tiled display.

FIG. 6 is a view illustrating white color variations of a tiled display. FIG. 7 is a view illustrating red color coordinate variations among display panels when a red image is displayed on a screen of a tiled display.

Efficiency and color coordinate variations of the OLED elements of the display panels PNL1 to PNL12 are compensated by using the optical compensation circuit before the product is released, and the white color coordinates (Wx, Wy) of the display panels PNL1 to PNL12 are adjusted to fit to preset white target color coordinates (W'x, W'y) through a combination representation of white data and one or more pure color data. As a result, the white color coordinate variations among the display panels PNL1 to PNL12 is small as illustrated in FIG. 6.

In the case of pure color such as red, green, and blue, optical compensation performed in the white color coordinates is not used so maximum color coordinates of the display panels (PNL1 to PNL12) are represented as is, resulting in large color coordinate variations among the display panels PNL1 to PNL12 as illustrated in FIG. 7. FIG. 7 illustrates an example of displaying red images on the display panels. The color coordinate difference of the pure color among the display panels PNL1 to PNL12 degrades image quality because the difference in color represented by each of the display panels (PNL1 to PNL12) is recognized.

Figure 8:
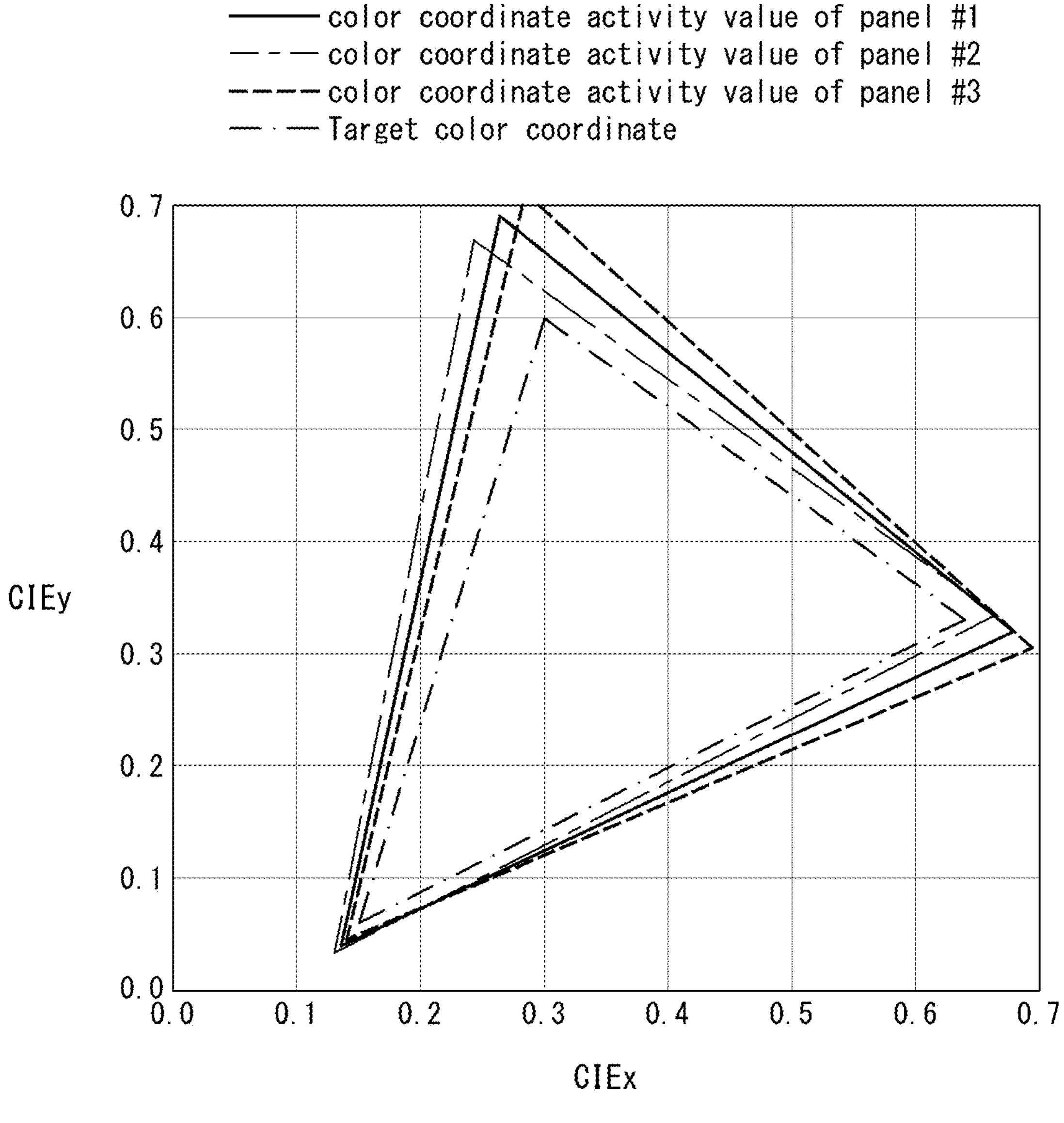
FIGS. 8 and 9 are views illustrating an optical compensation method according to a first embodiment of the present disclosure.

When representing pure color such as red, green, and blue color, the color coordinate compensation circuit (or unit) 132 combines a luminance ratio of white, red, green, and blue colors and optically compensate it according to a preset target RGB color coordinates (hereinafter, referred to as a "target RGB color coordinates"). The target RGB color coordinates are set to color coordinates smaller than a color gamut defined by maximum color coordinates of the display panels PNL1 to PNL12 so that it may include all the RGB color coordinates of all the display panels PNL1 to PNL12. When the tiled display includes three display panels, the target RGB color coordinates are smaller than the smallest color coordinates among the maximum RGB color coordinates of the display panels (panel #1 to panel #3) as in the example of FIG. 8. The target RGB color coordinates are set to satisfy the intersection of the color coordinates of each of the display panels (panel #1 to panel #3) as shown below to cover all the RGB color coordinates of all the display panels (panel #1 to panel #3) constituting the tiled display.

Figure 9:
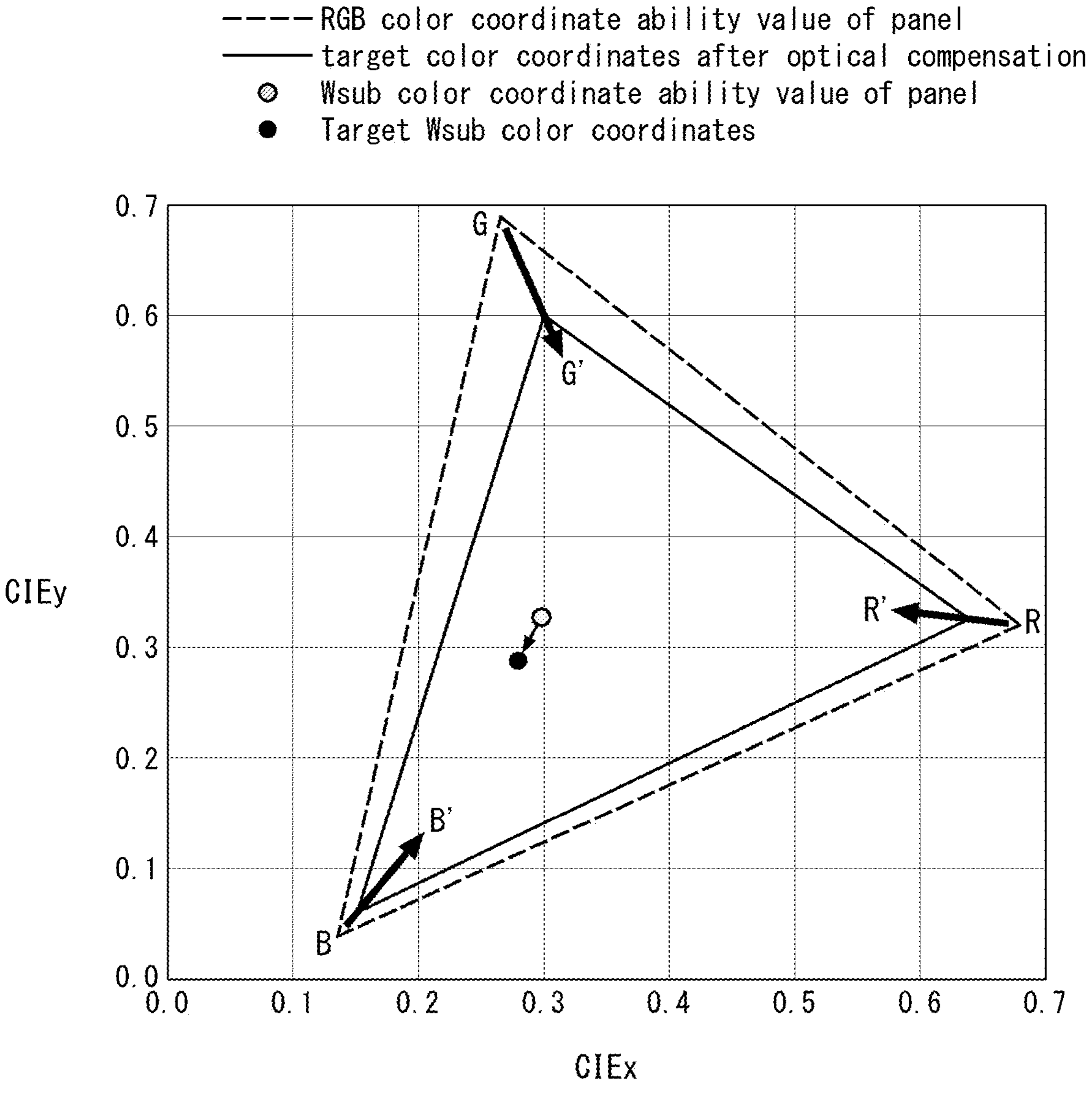

Target RGB color coordinates=Panel #1 RGB maximum color coordinates CI panel #2 RGB maximum color coordinates CI Panel #3 RGB maximum color coordinates FIG. 9 illustrates an example in which the RGB color coordinates of a display panel satisfy the DCI standard and the target RGB color coordinates satisfy the BT709 standard. In FIG. 9, "Wsub" represents white.

Referring to FIG. 9, when the RGB color coordinates of the display panels PNL1 to PNL12 are DCI 100% color coordinates, the target RGB color coordinates may be set to BT709 100%. Table 1 illustrates color coordinate values. In Table 1, Wx and Wy are the white color coordinates of the display panels PNL1 to PNL12. Rx and Ry are red color coordinates of the display panels PNL1 to PNL12. Gx and Gy are green color coordinates of the display panels PNL1 to PNL12. Bx and By are blue color coordinates of the display panels PNL1 to PNL12. W'x and W'y are white color coordinates of the target RGB color coordinates. R'x and R'y are red color coordinates of the target RGB color coordinates. G'x and Gy are green color coordinates of the target RGB color coordinates. B'x and B'y are blue color coordinates of the target RGB color coordinates.

TABLE 1

| Maximum RGB color coordinates of display panel (DCI level) | | Target RGB color coordinates (BT709 level) | |
|---|---|---|---|
| Wx | 0.300 | W'x | 0.285 |
| Wy | 0.326 | W'y | 0.294 |
| Rx | 0.680 | R'x | 0.640 |
| Ry | 0.320 | R'y | 0.330 |
| Gx | 0.265 | G'x | 0.300 |
| Gy | 0.690 | G'y | 0.600 |
| Bx | 0.140 | B'x | 0.150 |
| By | 0.050 | B'y | 0.060 |

When the highest gray level 255 of red is represented, the red color may be represented by only the gray value 255 of the red data. However, this method may cause a significant difference in the red color coordinates among the display panels PNL1 to PNL12 according to dispersion of the maximum color coordinates of red among the display panels PNL1 to PNL12. In the present disclosure, the color coordinates of pure colors such as red, green, and blue colors are adjusted to the target RGB color coordinates lower than the RGB color coordinates of the display panels PNL1 to PNL12 to minimize dispersion of the color coordinates of the pure colors among the display panels. Accordingly, in the tiled display of the present disclosure, since the color coordinates of the display panels PNL1 to PNL12 are reduced to the color coordinates of a color gamut lower than that of the RGB color coordinates of each of the display panels PNL1 to PNL12, a color reproduction range is lower than that of the display panels PNL1 to PNL12.

In order to minimize the difference in the pure color coordinates among the display panels PNL1 to PNL12, the second compensation unit 132 emits the subpixels by mixing two or more colors when representing the pure color such as red, green, and blue colors. In other words, the second compensation unit 132 compensates for variations of the pure color among the display panels PNL1 to PNL12 by adding two or more colors of white, red, green, and blue as in the optical compensation method below.

The second compensation unit 132 converts data of a first pure color of an input image into any one of a color combination of first pure color+second pure color, a combination of first pure color+third pure color, a combination of first pure color+white, a combination of first pure color+second pure color+third pure color, a combination of first pure color+second pure color+white, and a combination of first pure color+third pure color+white as in the optical compensation method below. However, when luminance of the first pure color is 100%, a luminance ratio of the first pure color among the above color combinations exceeds 50%. Here, the first pure color is any one of red (R), green (G), and blue (B). The second pure color is any one of the remaining two colors, excluding the first pure color, among red (R), green (G), and blue (B). The third pure color is one remaining color, excluding the first and second pure colors, among red (R), green (G), and blue (B).

The following example is an optical compensation method for white, red, green, and blue data.

W'255 gray=W+R or W+G or W+B or W+R+G or W+R+B or W+G+B

Here, W'255 gray is target white data of the gray value 255 that satisfies the target RGB color coordinates. W is white data. R, G and B are red data, green data and blue data, respectively. A luminance ratio of the white data W to luminance of the target white data (W'255 gray) exceeds 50%.

R'255 gray=R+G or R+B or R+W or R+G+B or R+G+W or R+B+W

Here, R'255 gray is target red data of the gray value 255 that satisfies the target RGB color coordinates. W is white data. R, G and B are red data, green data and blue data, respectively. A luminance ratio of the red data R to luminance of the target red data (R'255 gray) exceeds 50%.

G'255 gray=G+R or G+B or G+W or G+R+B or G+R+W or G+B+W

Here, G'255 gray is target green data of the gray value 255 that satisfies the target RGB color coordinates. W is white data. R, G and B are red data, green data and blue data, respectively. A luminance ratio of the green data G to luminance of the target green data (G'255 gray) exceeds 50%.

B'255 gray=B+R or B+G or B+W or B+R+G or B+R+W or B+G+W

Here, B'255 gray is target blue data of the gray value 255 that satisfies the target RGB color coordinates. W is white data. R, G and B are red data, green data and blue data, respectively. A luminance ratio of the blue data B to luminance of the target blue data (B'255 gray) exceeds 50%.

When luminance of the display panel is 100 nit, a luminance ratio of (W'), red (R'), green (G'), and blue (B') colors satisfying the target RGB color coordinates (BT709) defined in Table 1 are as follows.

W'100.00 nit:R'18.93 nit:G'71.22 nit:B'9.84 nit

In this luminance ratio, the luminance of each of white (W'), red (R'), green (G') and blue (B') is optically compensated as follows.

W'100.00 nit=W 97.02 nit+R 1.01 nit+B 1.97 nit

R'18.93 nit=R 16.47 nit+G 1.02 nit+W 1.44 nit

G'71.22 nit=G 61.75 nit+R 2.64 nit+W 6.84 nit

B'9.84 nit=B 7.90 nit+R 0.58 nit+W 1.36 nit

The second compensation unit 132 may modulate pixel data of the pure colors by applying the above-described optical compensation method to all the pixels on the entire screen of each of the display panels PNL1 to PNL12. In addition, the second compensation unit 132 may apply the optical compensation method to pixels of a partial region in the display panel as illustrated in FIGS. 10 and 11.

Figure 10:
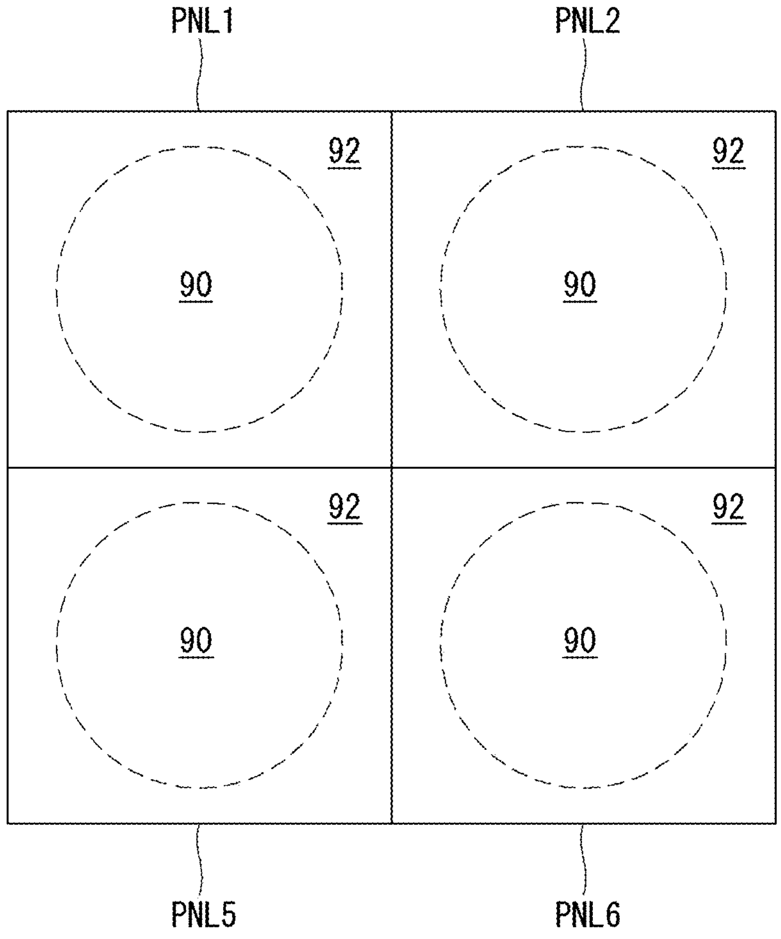
FIGS. 10 and 11 are views illustrating an optical compensation method according to a second embodiment of the present disclosure.
Figure 11:
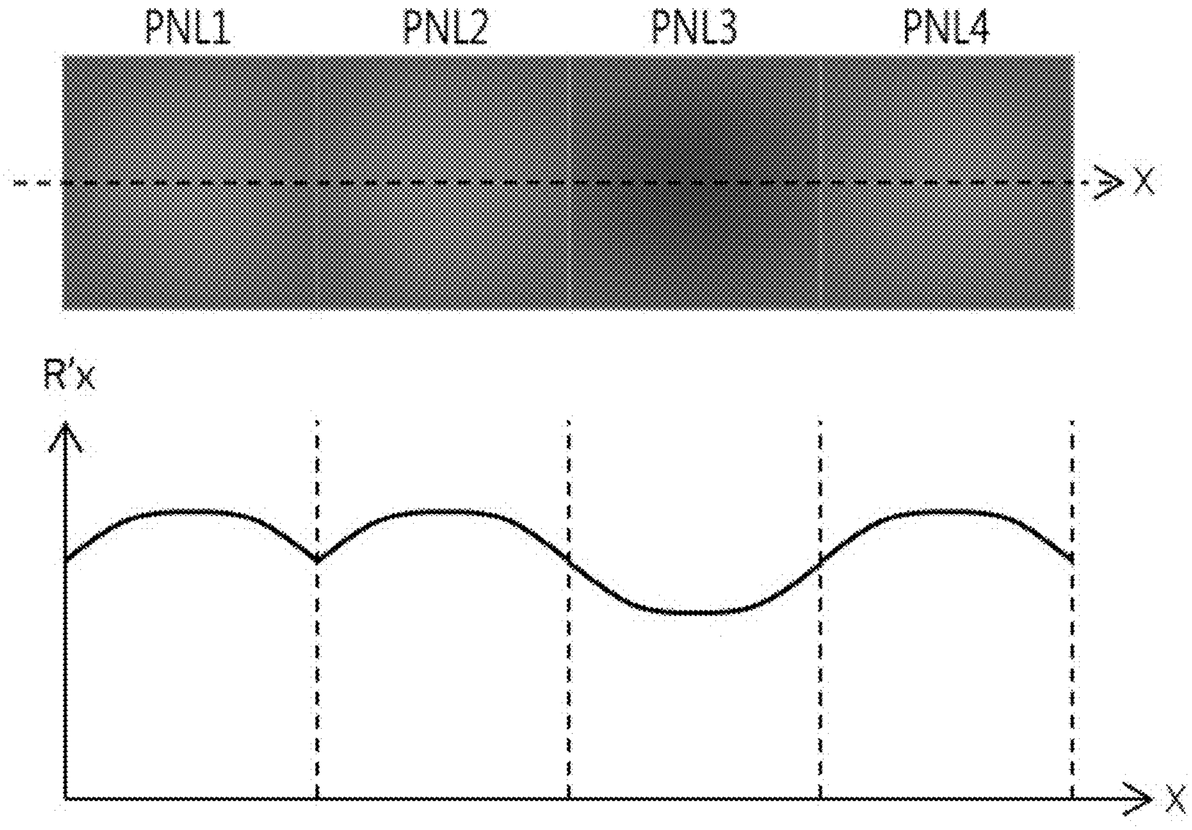

FIGS. 10 and 11 are views illustrating an optical compensation method according to a second embodiment of the present disclosure. FIG. 11 illustrates color coordinates (R'x)

of red on the x-axis passing through the center of each of the display panels PNL1 to PNL4.

Referring to FIGS. 10 and 11, the color coordinates of the pure color in each of the display panels PNL1 to PNL4 may not be uniform. In order to reduce the color coordinate variations in the panels, the second compensation unit 132 may apply optical compensation based on the outer pixel region 92 of each of the display panels PNL1 to PNL4 to reduce pure color coordinates among the display panels PNL1 to PNL4. Accordingly, the pure color (R', G', B') data to be written in the pixels of the outer pixel region 92 is implemented to have luminance by the color combinations described above and converted into reduced target RGB color coordinates, minimizing color coordinate variations with adjacent panels.

Figure 12:
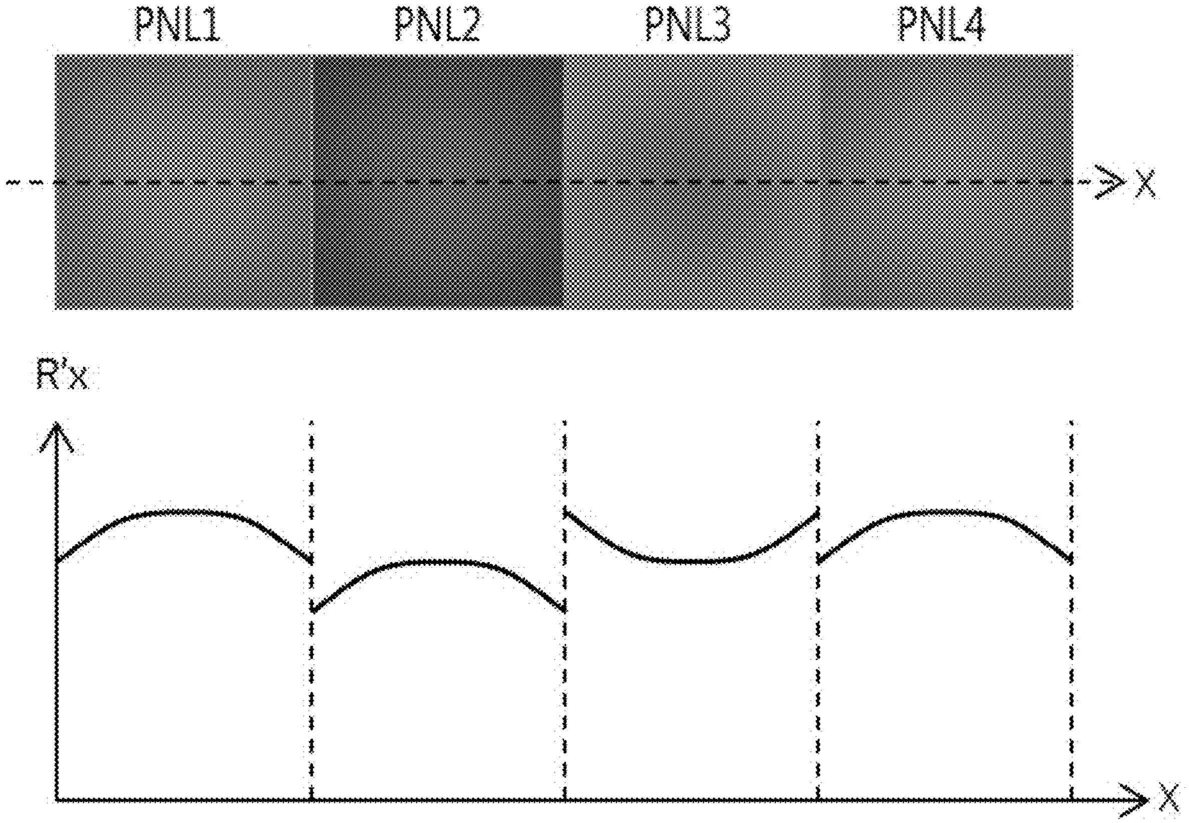
FIG. 12 is a diagram illustrating an example in which there are red color coordinate variations on a screen of a display panel.

FIG. 12 is a diagram illustrating an example in which there are red color coordinate variations on a screen of a display panel. In the example of FIG. 12, the difference between pure color coordinates is prominent in the boundaries between the display panels PNL1 to PNL4 when the red color coordinate variations are large between a central pixel area and an outer pixel area of the display panels. In the present disclosure, when there are pure color coordinate variations in the display panels as illustrated in FIG. 12, a color coordinate step at the boundaries between the display panels PNL1 to PNL4 is reduced by applying the optical compensation to the outer pixel region of the display panels.

As described above, according to the present disclosure, a difference in representation of pure colors among display panels may be minimized by converting the color coordinates of pure color data into the target color coordinates having a color gamut smaller than the color gamut defined in the color coordinates of each of the display panels constituting the tiled display and representing the pure color data by two or more colors.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A tiled display, comprising:

two or more display panels; and a color coordinate compensation circuit configured to:

convert color coordinates of pure color data to be displayed in the two or more display panels into target color coordinates having a color gamut smaller than a color gamut defined in color coordinates of each of the two or more display panels, and convert the pure color data into a combination of two or more different color data, wherein the color coordinate compensation circuit is configured to convert the pure color data into a combination of two or more pure color data or a combination of one or more pure color data and a white data, wherein the color coordinate compensation circuit is configured to convert a first pure color data into any one of a combination of a first pure color and a second pure color; a combination of the first pure color and a third pure color; a combination of the first pure color and a white: a combination of the first pure color, the second pure color, and the third pure color; a combination of the first pure color, the second pure color, and the white; and a combination of the first pure color, the third pure color, and the white, and wherein when luminance of the first pure color is 100%, a luminance ratio of the first pure color in the color combinations exceeds 50%.

2. The tiled display of claim 1, wherein the first pure color is any one of red, green, and blue, the second pure color is any one of the remaining two colors, excluding the first pure color, among the red, green, and blue, and the third pure color is one remaining color, excluding the first pure color and the second pure color, among the red, green, and blue.

3. The tiled display of claim 1, further comprising:

a plurality of display panel drivers configured to drive the display panels, respectively, wherein the color coordinate compensation circuit is connected to one of the display panel drivers or commonly connected to the plurality of display panel drivers.

4. The tiled display of claim 1, wherein the pure color data is data to be displayed in a partial region of the two or more display panels.

5. The tiled display of claim 4, wherein the partial region includes an outer pixel region of the two or more display panels.

6. An optical compensation method of a tiled display comprising:

converting color coordinates of pure color data to be displayed in two or more display panels into target color coordinates having a color gamut smaller than a color gamut defined in color coordinates of each of the display panels; and converting the pure color data into a combination of two or more different color data, wherein the pure color data is converted into a combination of two or more pure color data or a combination of one or more pure color data and a white data, wherein a first pure color data is converted into any one of: a combination of a first pure color and a second pure color, a combination of the first pure color and a third pure color; a combination of the first pure color and a white; a combination of the first pure color, the second pure color, and the third pure color; a combination of the first pure color, the second pure color, and the white, and a combination of the first pure color, the third pure color, and the white, and wherein when luminance of the first pure color is 100%, a luminance ratio of the first pure color in the color combination exceeds 50%.

7. The optical compensation method of claim 6, wherein the pure color data is data to be displayed in a partial region of the two or more display panels.

8. The optical compensation method of claim 7, wherein the partial region includes an outer pixel region of the two or more display panels.

* * * * *